2,779,885

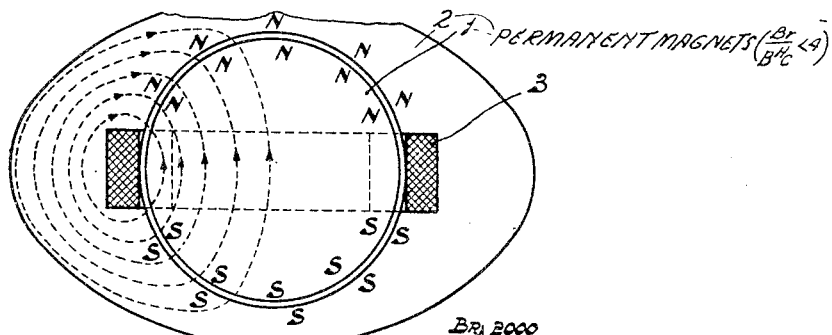
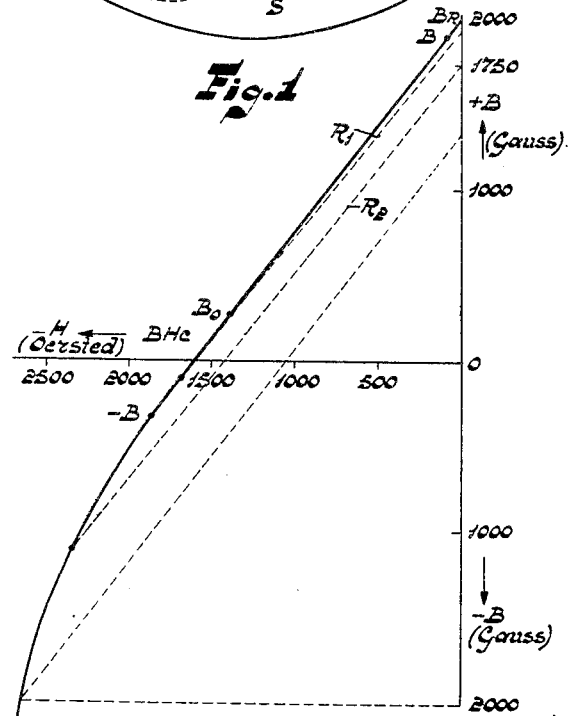
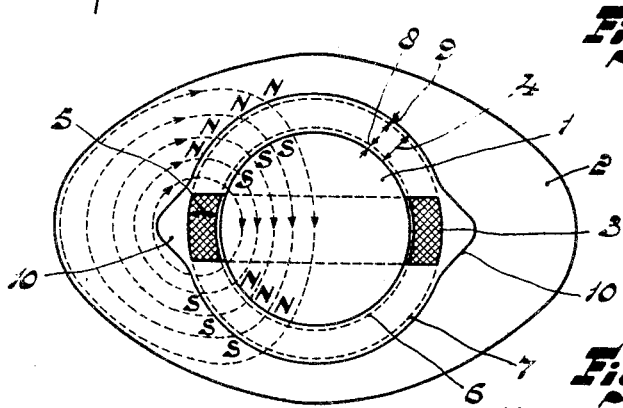
Inventors
Maximilien Felix Reynst
Johannes Meyer Cluwen
By
Agent

United States Patent Office 2,779,885
Patented Jan. 29, 1957

ELECTRICAL APPARATUS IN WHICH A PERMANENT MAGNET IS INCLUDED IN THE MAGNETIC CIRCUIT

Maximilien Felix Reynst and Johannes Meyer Cluwen, Eindhoven, Netherlands, assignors to Hartford National Bank and Trust Company, Hartford, Conn., as trustee Application October 29, 1952, Serial No. 317,528

Claims priority, application Netherlands November 28, 1951

3 Claims. (Cl. 310—152)

This invention relates to electrical apparatus, for example high frequency apparatus, the magnetic circuit including a permanent magnet, and it is characterized in that on either side of the winding the magnetic circuit is made at least substantially of permanent magnetic material which is not capable of being demagnetised in practice and has an electric resistance of at least 1000, preferably at least $10^5$, ohm-cm., the term "not capable of being demagnetised in practice" being understood to mean at least that after removal from the magnetising apparatus without further precautions being taken—such for example as the usual measure of arranging a short-circuited circuit of soft iron between the north and south poles prior to removal—the magnet is substantially not demagnetised and consequently returns in practice to the working point $B_r$ (remanence) when the magnet is subsequently included in a closed iron circuit. The above mentioned expression is preferably understood to mean in addition that appreciable demagnetisation does not occur if two identical magnets are arranged outside a magnetic circuit so that the poles of like nature be in contact and are then separated. Even in this case the working point will, when the magnet is included in a closed soft iron circuit, be compelled to return substantially to the point $B_r$ and this means for a generator that the voltage and for an engine that the torque remains substantially constant.

The high electric resistance of the material in conjunction with the arrangement of this material on either side of the winding permits of building high-frequency apparatus in which the losses are particularly low, it being not necessary for the entire magnetic circuit to be made of the said material. It is also possible for parts of the circuit to be constituted by a soft magnetic material. This material may be material having also high electric resistance, such, for example, as a ferromagnetic ferrite material or material having comparatively low electric resistance for high-frequency circuits, so long as it is arranged at a point in the circuit at which the influence on the total high frequency losses is still looked upon as admissible.

The said permanent magnet materials which can withstand severe demagnetizing influences generally satisfy the condition that the ratio between remanence ($B_r$) and coercive force ($_BH_c$) of the material is less than 4, preferably less than 2.

According to a further feature of the invention the said permanent magnetic material has a $BH_{max}$-value of at least $0.7 \times 10^6$.

Materials highly suited for this purpose are described in British Patent No. 708,127. These materials are constituted substantially by non-cubic crystals of polyoxides of Fe and at least one of the metals Ba, Sr, Pb and, if required, Ca, more particularly single crystals and/or mixed crystals having the structure of magnetoplumbite of the composition $MeO.6Fe_2O_3$, where Me represents any of the metals Pb, Ba and Sr. Such a material may have a ratio $B_r/_BH_c = 2000/1640 = $ about 1.2. In times when the raw materials are not plentiful these materials, which do not contain Co or Ni, are very important. In addition, these materials have a comparatively high resistance of at least $10^5$ ohm-cm., for example $3 \times 10^7$ ohm-cm., so that the apparatus is highly suited for high frequency purposes. In spite of the larger volume which would be obtained by means of these materials which, compared with the use of the known modern magnet steel, have a comparatively low $(BH)_{max}$-value of for example 1 to $1\frac{1}{2} \times 10^6$, acceptable weights are obtainable owing to the low specific gravity.

The invention will now be described with reference to the accompanying drawing, in which:

Fig. 1 is a plan view of one form of electrical apparatus in accordance with the invention;

Fig. 2 shows the demagnetization curve of a material as described in British Patent 708,127;

Fig. 3 is a plan view of a modification of the apparatus as shown in Fig. 1.

Referring to Fig. 1, 1 designates a rotor which is wholly constituted by permanent magnet material of the kind mentioned above and one half of which is magnetized as the north-pole N and the other half as the south-pole S. If desired, magnetisation may be effected at higher temperatures in the neighbourhood of the Curie point with the use of a low field strength of, say, 500 oersteds. An elongated stator 2 is similarly made wholly from the said kind of magnet material and also comprises a north-pole part and a south-pole part. Arranged within the neutral zone is a coil 3 which both on the inner surface and on the outer surface but also at the two ends is provided with permanent magnet material. The variation of the lines of force in rotor and stator is designated for one half by broken lines. If the mean magnet lengths of rotor and stator are identical, the working point—in the position shown, in which poles of like nature face each other—will be located on the (BH) curve for example at the point $B_0$ (Fig. 2). By rotation of the rotor till the poles of unlike nature register with each other a series combination of the two magnets 1 and 2 is obtained. Since the width of the airgap is small compared with the magnet, the working point on the (BH) curve will become located, for example, at the point B so that the flux variation is almost from $B_0$ to $B_r$. This figure shows the values obtained for B and H by employing a material of the above-mentioned kind according to the British Patent 708,127, the electrical resistance being at least $10^5$ ohm-cm. The figure also shows the reversible curves R1 and R2 which reveal that a negligible demagnetisation is set up at $-H=1700$ oersteds and a low demagnetisation which may be admissible is not set up until at $-H=2350$ oersteds.

If the mean magnet length of the stator exceeds materially that of the other part, the flux variation is even increased since in this case with registering poles of like nature the working point may vary, for example, as far as the point $-B$. Instead of being included in the stator, the coil 3 may be included for example in the rotor, as is designated by broken lines. As an alternative, the rotor and its coil may be stationary, whereas the stator is rotary. If desired, the two may be arranged so as to rotate in opposite sense.

Referring to Fig. 3, the parts 1 and 2 are made wholly of the above-mentioned magnet material similarly to the construction of Fig. 1 but in contradistinction thereto the winding 3 of the apparatus is arranged between the parts 1 and 2, the airgap 4 being wider than the thickness 5 of the winding. The winding 3 is relatively adapted to rotate in relation to the parts 1 and 2 which are stationary in relation to each other. The magnetic poles, which are arranged opposite each other on either side of the airgap, are of opposite polarity. If the coil or the magnetic circuit as a whole rotates a flux variation ensues between $+\Phi$ and $-\Phi$ so that the E. M. F. of the apparatus acting as a generator is almost twice as high as with the apparatus shown in Fig. 1. Due to the large total length of the magnet it is even possible to obtain a sufficiently strong field in the wide airgap (which for a generator of about 150 watts may be for example 1 cm.). If the above-mentioned material is used the field in the airgap may be for example on an average 1600 Gauss and in the magnet 1800 Gauss. This material may be expected to be cheaper in mass production than piled sheets, which hitherto have been customary for a part of the magnetic circuit and it will be possible for the total weight to be reduced owing to the low specific gravity.

In order further to reduce the reluctance in the airgap provision may be made of soft iron parts 6 and 7 in the annular space between the parts 1 and 2, said parts being, if required, secured to the winding 3, as shown in broken lines, with the result that the wide airgap 4 is reduced to two narrow airgaps 8 and 9. If the apparatus is required for high-frequency purposes the parts 6 and 7 may be made of material having a high electric resistance such, for example, as a ferromagnetic ferrite material.

The spaces 10 are recessed in order to economize in material.

What we claim is:

1. Electrical apparatus adapted for operation in the higher frequency portions of the electromagnetic spectrum, comprising a closed magnetic circuit including, in combination, a substantially cylindrical permanent magnet defining by its outer periphery one side of an airgap, a hollow permanent magnet surrounding said cylindrical permanent magnet and defining by its inner periphery the opposite side of said air-gap, and a winding mounted between the two permanent magnets and in a position communicating with said air-gap, each of said two magnets being magnetized in a radial direction and thus having at least two poles of opposite polarity on the periphery thereof defining the air-gap, each of said two magnets having a ratio of remanent inductance and coercive field strength of less than 4 whereby said magnets are capable of withstanding severe demagnetizing influences, said hollow permanent magnet having an elliptical shape establishing a predetermined relationship between the mean magnetic lengths of each of said two permanent magnets, and means to produce relative movement between the winding and at least one of the permanent magnets thereby to induce an electromotive force in said winding.

2. Electrical apparatus as set forth in claim 1, wherein the elliptical shape of the hollow permanent magnet is such that the mean magnetic length of the portion of the magnetic circuit constituted by the hollow permanent magnet is greater than the mean magnetic length of the portion of the magnetic circuit constituted by the cylindrical permanent magnet, thereby to increase the magnitude of the induced electromotive force, and the two magnets are each constituted of a permanent magnet material consisting essentially of a composite oxide of iron and at least one of the metals selected from the group consisting of barium, strontium and lead.

3. Electrical apparatus as set forth in claim 1 wherein the winding is mounted within the air gap, a soft magnetic member having a high electrical resistivity is mounted in the air-gap and coupled to the winding, the two permanent magnets are fixed, and the winding and soft magnetic member are rotatable relative to the fixed magnets.

References Cited in the file of this patent
UNITED STATES PATENTS

| | | |
|---|---|---|
| 427,294 | Brace | May 6, 1890 |
| 465,808 | Thury | Dec. 22, 1891 |
| 589,674 | Sleeper | Sept. 7, 1897 |
| 1,360,654 | Littlefield | Nov. 30, 1920 |
| 1,947,269 | Leibing | Feb. 13, 1934 |

FOREIGN PATENTS

| | | |
|---|---|---|
| 172,121 | Switzerland | Feb. 16, 1935 |

OTHER REFERENCES

Article: "Permanent Magnet Alloys," by Earl M. Underhill, Electronics, January 1948.

Article: "Permanent Magnets Have Four Major Jobs," by Charles Maynard; reprinted from Electrical Manufacturing, November 1944.